United States Patent
Wang

(10) Patent No.: US 10,345,089 B2
(45) Date of Patent: Jul. 9, 2019

(54) LIGHTING STRUCTURE FOR DISTANCE MEASURING WHEEL

(71) Applicant: Hung-Hui Wang, Taichung (TW)

(72) Inventor: Hung-Hui Wang, Taichung (TW)

( * ) Notice: Subject to any disclaimer, the term of this patent is extended or adjusted under 35 U.S.C. 154(b) by 28 days.

(21) Appl. No.: 15/886,852

(22) Filed: Feb. 2, 2018

(65) Prior Publication Data

US 2018/0156593 A1   Jun. 7, 2018

(30) Foreign Application Priority Data

Sep. 20, 2017   (TW) .............................. 106213981 U

(51) Int. Cl.
| | |
|---|---|
| *G01B 3/12* | (2006.01) |
| *H01H 13/14* | (2006.01) |
| *H01R 13/66* | (2006.01) |
| *F21V 33/00* | (2006.01) |
| *H01M 10/46* | (2006.01) |
| *F21Y 115/10* | (2016.01) |
| *G01B 7/14* | (2006.01) |

(52) U.S. Cl.
CPC ................ *G01B 3/12* (2013.01); *F21V 33/00* (2013.01); *H01H 13/14* (2013.01); *H01R 13/6675* (2013.01); *F21Y 2115/10* (2016.08); *G01B 7/14* (2013.01); *H01M 10/46* (2013.01)

(58) Field of Classification Search
CPC ........... A47L 9/2857; A47L 9/30; G01B 3/12; G01B 7/14; F21V 33/00; H01H 13/14; H01R 13/6675; H01M 10/46; F21Y 2115/10

See application file for complete search history.

(56) References Cited

U.S. PATENT DOCUMENTS

| | | | | |
|---|---|---|---|---|
| 3,497,959 A | * | 3/1970 | Engelsman | G01B 3/12 250/233 |
| 4,176,458 A | * | 12/1979 | Dunn | G01B 3/12 33/781 |
| 4,532,710 A | * | 8/1985 | Kinney | G01B 3/12 235/95 R |
| 5,107,946 A | * | 4/1992 | Kamimura | G05D 1/027 180/167 |
| 5,161,313 A | * | 11/1992 | Rijlaarsadam | B41K 3/10 33/773 |
| 5,943,785 A | * | 8/1999 | Kondo | G01D 5/34723 33/773 |
| 2009/0217542 A1 | * | 9/2009 | Watkins | A63C 19/06 33/775 |
| 2011/0068778 A1 | * | 3/2011 | Lai | G01B 3/12 324/207.25 |

* cited by examiner

*Primary Examiner* — Anh T Mai
*Assistant Examiner* — Fatima N Farokhrooz

(57) ABSTRACT

A lighting structure for distance measuring wheel has a case, a circuit board, a switch, a power supply port, a power supply, a light source and a display unit. The circuit board, the power supply, and the light source are accommodated in the case. One part of the switch is arranged in the case and electrically connected to the circuit board and the other part of the switch is exposed outside of the case. The display unit is arranged below the case and a display screen is arranged thereon. An inclined surface is formed at a lower corner of the case and faced to the display screen of the display unit, the light source is electrically connected to the circuit board and a light beam emitted from the light source penetrates through the inclined surface toward the display screen of the display unit.

6 Claims, 8 Drawing Sheets

LIGHTING STRUCTURE FOR DISTANCE MEASURING WHEEL

FIELD OF THE INVENTION

The present invention relates to a distance measuring wheel, and more particularly to a lighting structure for distance measuring wheel.

BACKGROUND OF THE INVENTION

A conventional distance measuring wheel includes a housing, two folding devices, an initialization device, a wheel, an initialization unit and a braking unit. The initialization unit includes first links which drives the swift plate of the initialization device. The braking unit includes second links which drives the brake pads of the initialization device such that the initialization and barking are independently operated and do not affect each other.

However, if being in the dark, the data or values shown on the display unit are hard to read and see. The user may need to use one hand to hold the distance measuring wheel and the other hand to hold a light source, such like flashlight, to light the display unit. It is inconvenient for the user.

In view of the foregoing circumstances, the inventor has invested a lot of time to study the relevant knowledge, compare the pros and cons, research and develop related products. After quite many experiments and tests, the "lighting structure for distance measuring wheel" of present invention is eventually launched to improve the foregoing shortcomings, to meet the public use.

SUMMARY OF THE INVENTION

An object of present invention is providing a lighting structure for distance measuring wheel. When the user uses the distance measuring wheel of the present invention in the dark, the light source may be turned on be pressing the switch to light the display screen of the display unit so that the user may clearly see the data or values shown on the display screen of the display unit.

To achieve above objects, a lighting structure for distance measuring wheel may comprise a case, a circuit board, a switch, a power supply port, a power supply, a light source and a display unit, the circuit board, the power supply, and the light source is accommodated in the case, one part of the switch is arranged in the case and electrically connected to the circuit board, the other part of the switch is exposed outside of the case, the display unit is arranged below the case and a display screen is arranged thereon, an inclined surface is formed at a lower corner of the case and faced to the display screen of the display unit, the light source is electrically connected to the circuit board and a light beam emitted from the light source penetrates through the inclined surface toward the display screen of the display unit, the power supply port is arranged at a front end of the case and electrically connected to the circuit board, and the power supply is electrically connected to the circuit board.

In some embodiments, the power supply is a dry cell or a rechargeable battery.

In some embodiments, the switch is a push switch.

In some embodiments, the power supply port is a USB port.

In some embodiments, the case includes an upper portion and a lower portion, the upper portion is detachably covered with the lower portion, and the inclined surface is arranged at the lower portion.

In some embodiments, the inclined surface is a transparent light guiding surface.

In some embodiments, the light source is an LED or an LED set.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
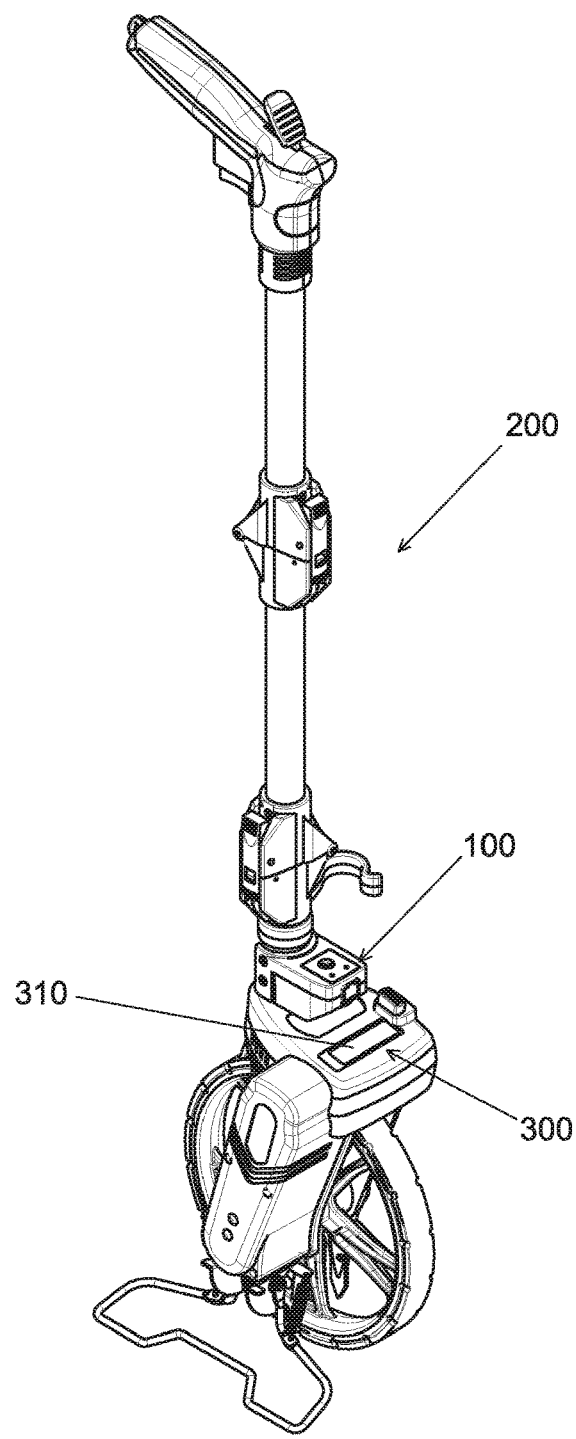
FIG. 1 is a perspective view of a distance measuring wheel of the present invention.
Figure 2:
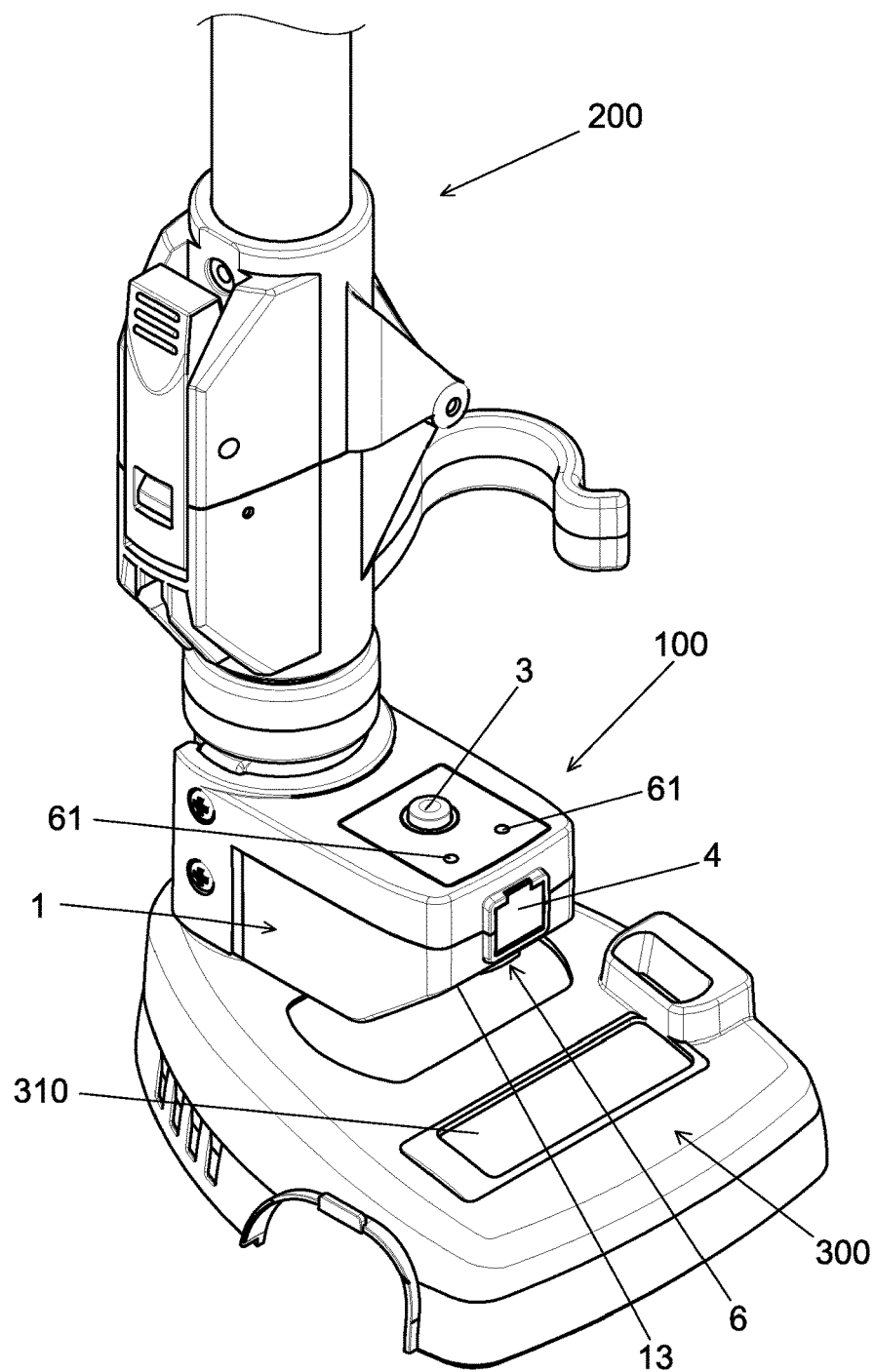
FIG. 2 is a partial perspective view of the distance measuring wheel of the present invention.
Figure 3:
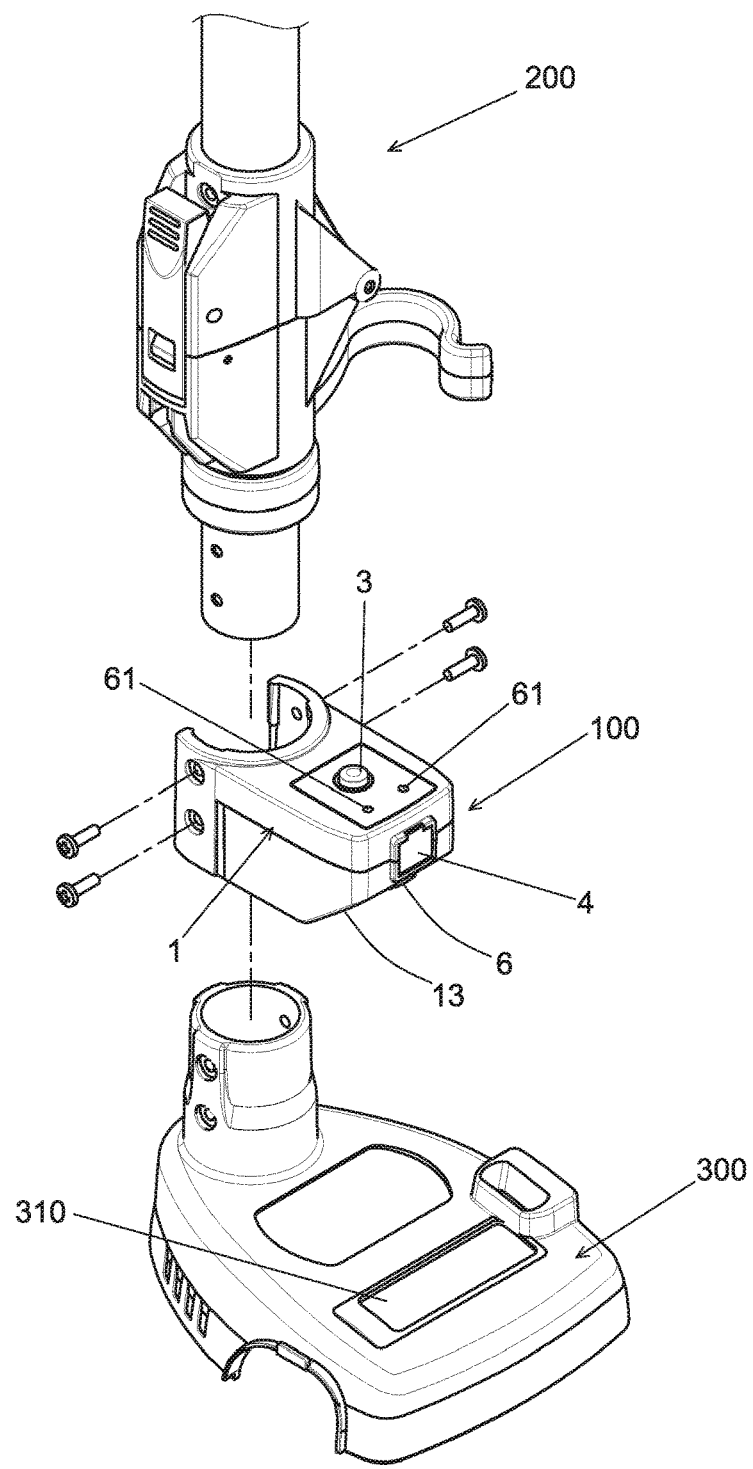
FIG. 3 is an exploded view of FIG. 2.
Figure 4:
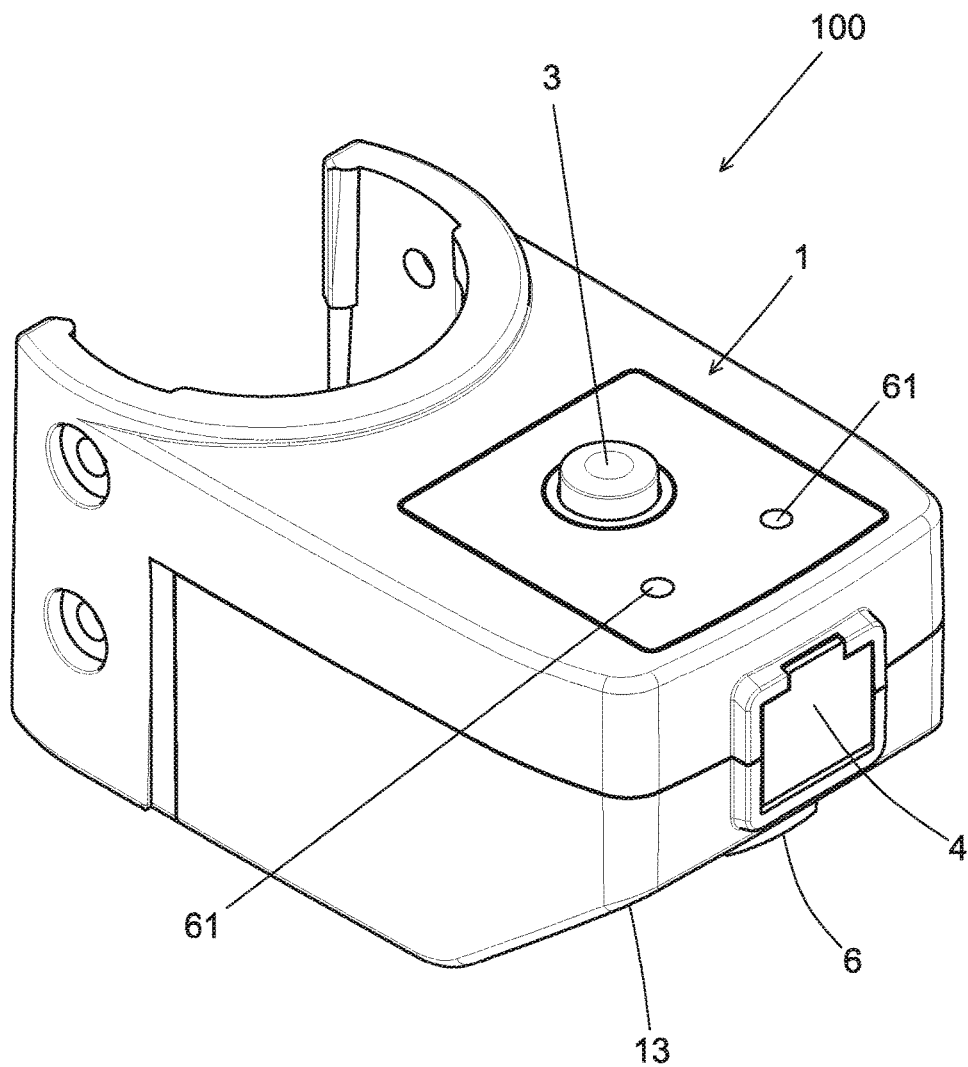
FIG. 4 is a perspective view of a lighting structure for the distance measuring wheel according to an embodiment of the present invention.
Figure 5:
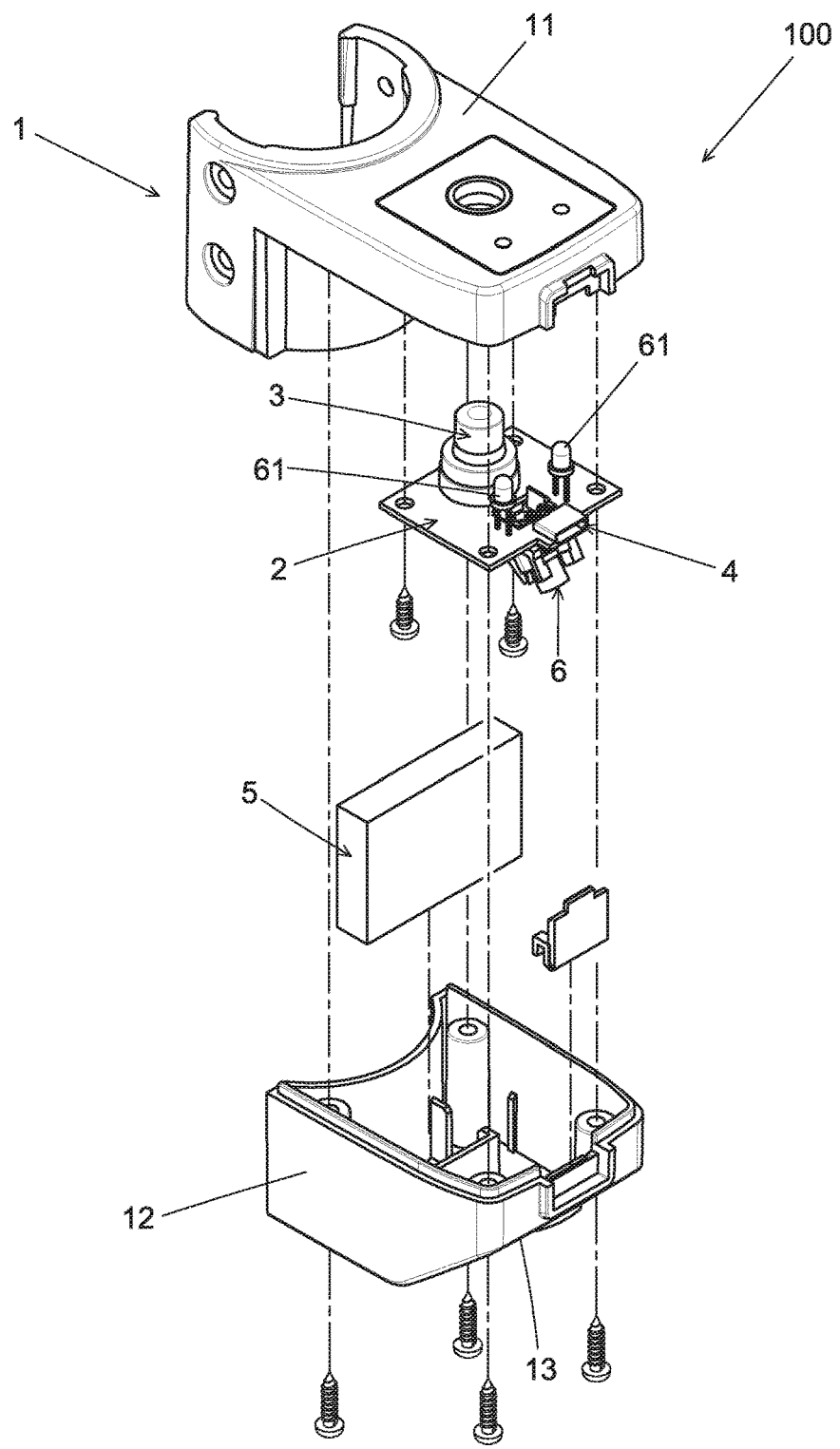
FIG. 5 is an exploded view of FIG. 4.
Figure 6:
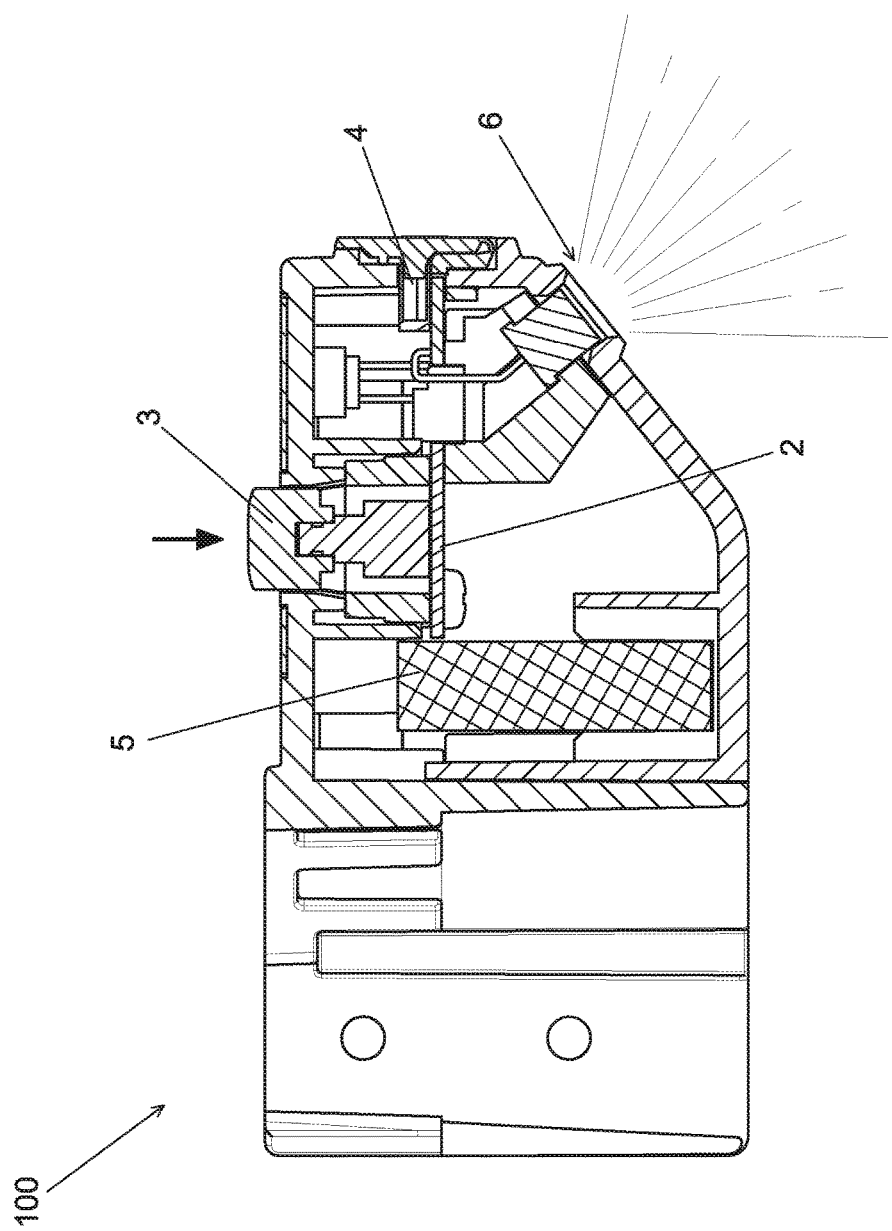
FIG. 6 is a cross-sectional view of FIG. 4.
Figure 7:
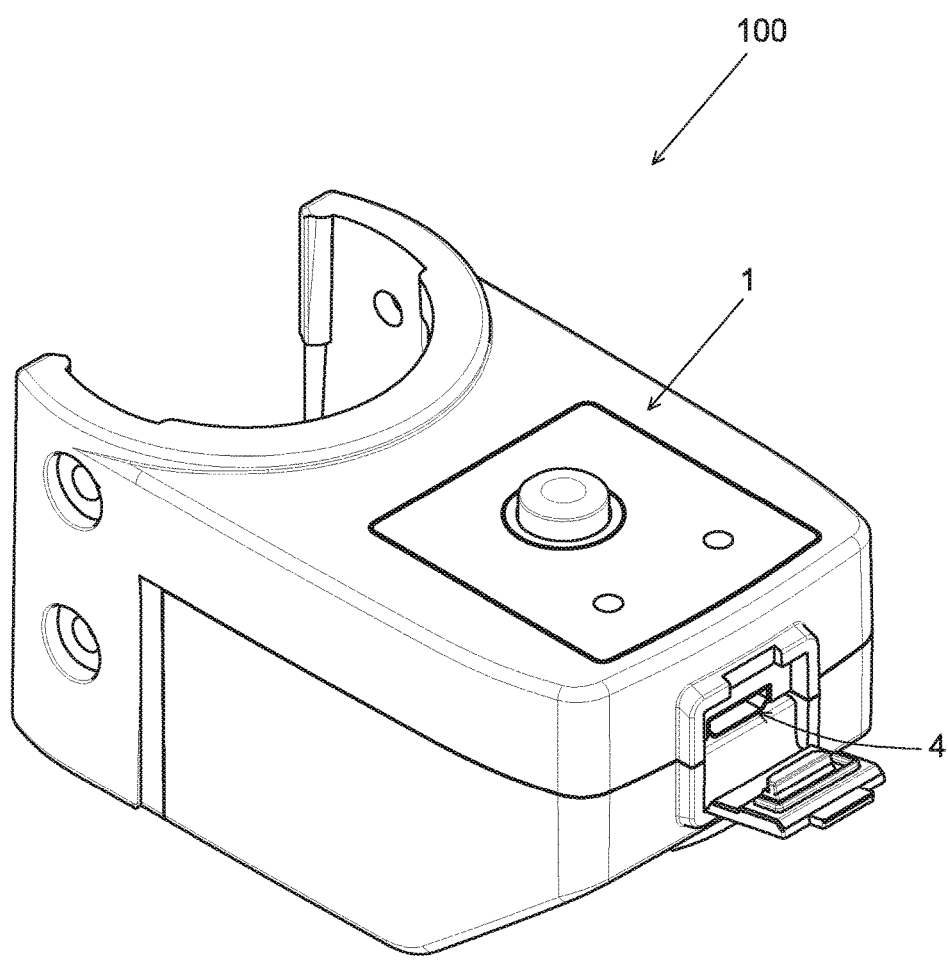
FIG. 7 is a perspective view of a power supply port while opening shown in FIG. 4.

Referring now to the drawings where like characteristics and features among the various figures are denoted by like reference characters.

Please refer to FIGS. 1 to 7, a lighting structure 100 according to an embodiment of the present invention is mounted above a display unit 300 of a distance measuring wheel 200 or embedded in the display unit 300.

The lighting structure 100 comprises a case 1, a circuit board 2, a switch 3, a power supply port 4, a power supply 5, and a light source 6. The circuit board 2, the power supply 5, and the light source 6 is connected with the case 1 (preferably, the light source 6 is accommodated in the case 1). The case 1 includes an upper portion 11 and a lower portion 12 which are detachably covered each other. The switch 3 may be a push switch. One part of the switch 3 is arranged in the case 1 and electrically connected to the circuit board 2 and the other part thereof is exposed outside of the case 1 so as to provide for switching ON/OFF. An inclined surface 13 is formed at a lower corner of the case 1 and faces to a display screen 310 of the display unit 300. That is, the inclined surface 13 is arranged at the lower portion 12. The inclined surface 13 may be a transparent light guiding surface. The light source 6 may be an LED (light emitting diode) or an LED set. The light source 6 may further include at least one alarm LED 61 which may be green, orange, and red so as to show the quantity of the power. The light source 6 may be electrically connected to the circuit board 2. A light beam emitted from the light source 6 may penetrate through the inclined surface 13 toward the display screen 301 of the display unit 300. The power supply port 4 may be a USB port. The power supply port 4 is arranged at a front end of the case 1 and electrically connected to the circuit board 2. The power supply 5 may be a dry cell or a rechargeable battery and electrically connected to the circuit board 2.

Figure 8:
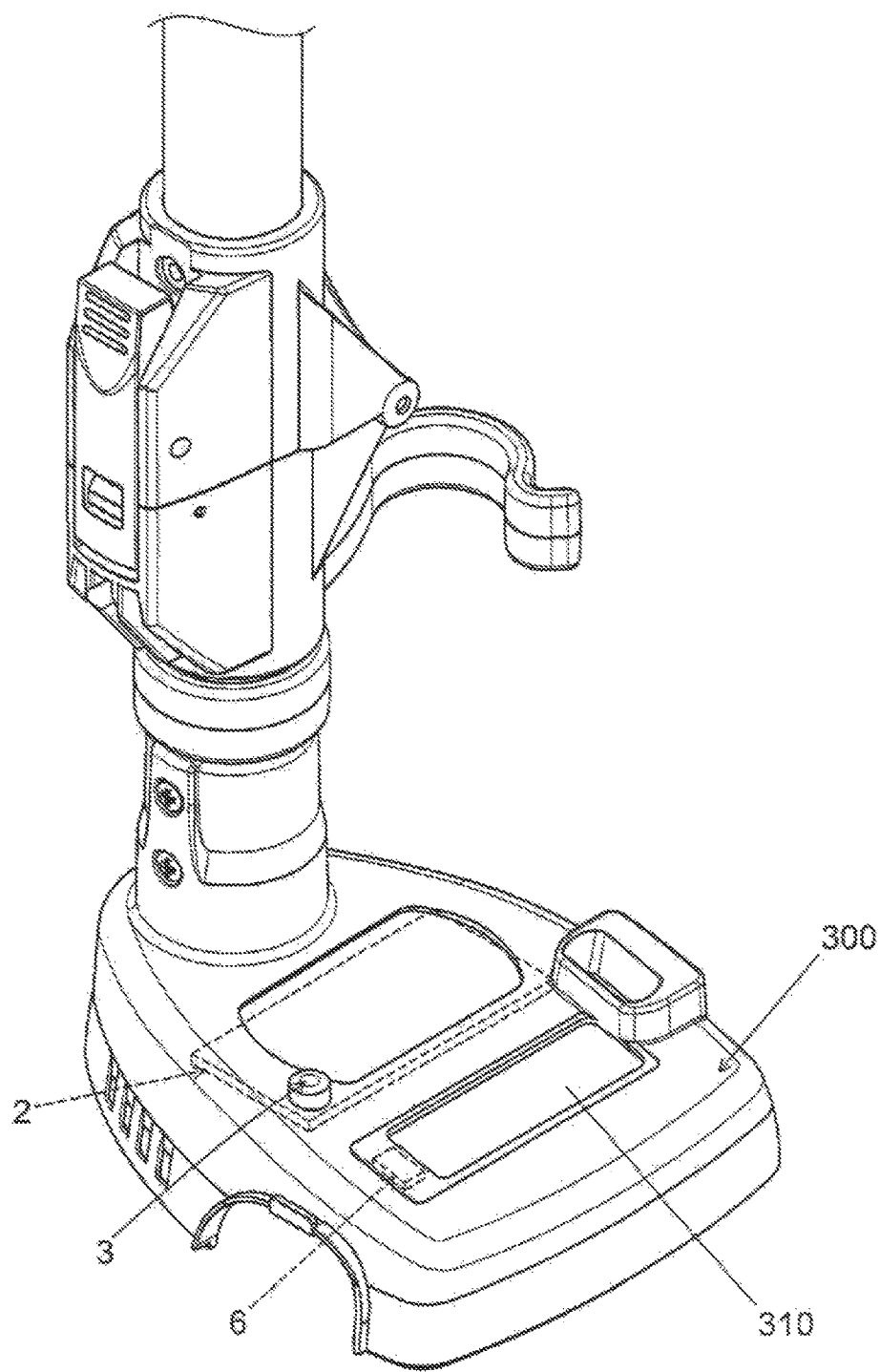
FIG. 8 is a perspective view of another embodiment of the lighting structure for distance measuring wheel of the present invention.

Please refer to FIG. 8, it shows another embodiment of the lighting structure 100 of the present invention. The lighting structure 100 comprises the circuit board 2, the light source 6, and the switch 3. The circuit board 2 is arranged in the display unit 300. Part of the switch 3 is arranged in the display unit 300 and electrically connected to the circuit board 2. The other part of the switch 3 is exposed outside of the display unit 300. The light source 6 faces to the display screen 310 of the display unit 300 so as to light the display screen 310 of the display unit 300.

The light source 6 may be an LED or an LED set. The switch 3 may be a push switch. The circuit board 2, the light source 6, and the switch 3 may be electrically connected to a power supply (not shown) of the display unit 300.

According to above mentioned structure, when the user uses the distance measuring wheel 200 of the present invention in the dark, the light source 6 may be turned on be pressing the switch 3 to light the display screen 310 of the display unit 300 so that the user may clearly see the data or values shown on the display screen 310 of the display unit 300.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

What is claimed is:

1. A lighting structure within a distance measuring wheel, comprising a case, a circuit board, a switch, a power supply port, a power supply, a light source and a display unit, the circuit board, the power supply, and the light source is connected with the case and faced to the display unit, one part of the switch is arranged in the case and electrically connected to the circuit board, the other part of the switch is exposed outside of the case, the display unit is arranged below the case and a display screen is arranged thereon, the power supply port is arranged at a front end of the case and electrically connected to the circuit board, and the power supply is electrically connected to the circuit board wherein the case includes an upper portion and a lower portion, the upper portion is detachably covered with the lower portion, and an inclined surface is arranged at the lower portion and wherein the inclined surface is a transparent light guiding surface.

2. The lighting structure as claimed in claim 1, wherein the inclined surface is formed at a lower corner of the case and faced to the display screen of the display unit, the light source is electrically connected to the circuit board and a light beam emitted from the light source penetrates through the inclined surface toward the display screen of the display unit.

3. The lighting structure as claimed in claim 1, wherein the power supply is a dry cell or a rechargeable battery.

4. The lighting structure as claimed in claim 1, wherein the switch is a push switch.

5. The lighting structure as claimed in claim 1, wherein the power supply port is a USB port.

6. The lighting structure as claimed in claim 1, wherein the light source is an LED or an LED set.

* * * * *